United States Patent [19]

Sauer

[11] Patent Number: 4,985,671
[45] Date of Patent: Jan. 15, 1991

[54] POWER SUPPLY CIRCUIT FOR A MOTOR VEHICLE WITH TWO LOAD VOLTAGES

[75] Inventor: Gerd Sauer, Stolberg-Venwegen, Fed. Rep. of Germany

[73] Assignee: Saint Gobain Vitrage, Courbevoie, France

[21] Appl. No.: 299,425

[22] Filed: Jan. 23, 1989

[30] Foreign Application Priority Data

Jan. 20, 1988 [DE] Fed. Rep. of Germany ....... 3801478

[51] Int. Cl.⁵ .................. B60R 16/00; H02M 3/00
[52] U.S. Cl. .................. 323/282; 307/10.1; 307/10.6; 219/203; 322/12
[58] Field of Search .......... 323/267, 282; 307/36, 307/38–39, 125, 126, 130, 9.1, 10.1, 10.6, 10.7; 322/12; 219/202, 203

[56] References Cited

U.S. PATENT DOCUMENTS

| | | | |
|---|---|---|---|
| 4,188,527 | 2/1980 | Follmer | 219/202 |
| 4,267,433 | 5/1981 | Sahm, III | 219/203 |
| 4,604,528 | 8/1986 | Norton | 307/9.1 |
| 4,673,797 | 6/1987 | Weirick | 219/203 |
| 4,678,982 | 7/1987 | Offiler et al. | 307/10.1 |
| 4,780,619 | 10/1988 | Campbell et al. | 307/10.1 |

Primary Examiner—Peter S. Wong
Attorney, Agent, or Firm—Oblon, Spivak, McClelland, Maier & Neustadt

[57] ABSTRACT

A reasonably priced power supply circuit for a motor vehicle with two different load voltages, viz. the normal vehicle supply system voltage and a voltage higher than this for operation of a window heating glazing with a thin-film heating resistor. A generator is designed for the higher voltage, which corresponds at least to the voltage required for operation of the window heating glazing. With the window heating glazing switched off, the voltage supplied by the generator is adjusted to the vehicle supply system voltage by a controller. With the window heating glazing switched on, the vehicle supply system voltage is derived from the higher voltage. To ensure a safe operating condition, a time switch for the temporary reduction of the exciter current for the generator during change-over of the load switch, a main timer for limitation of the heating time and a threshold voltage switch for limitation of the generator voltage are provided as additional monitoring elements.

12 Claims, 2 Drawing Sheets

POWER SUPPLY CIRCUIT FOR A MOTOR VEHICLE WITH TWO LOAD VOLTAGES

BACKGROUND OF THE INVENTION

1. Field of the Invention

This invention relates generally to a power supply circuit for a motor vehicle and more particularly to a power supply circuit for a motor vehicle with two different load voltages.

2. Discussion of the Background

The usual power supply circuit for motor vehicles comprises a three-phase ac generator consisting of a rotor with a dc current and a three-phase coil arranged in the stator. The three-phase voltage produced during the rotation of the rotor is converted into a pulsating dc voltage in a rectifier bridge and fed to the vehicle supply system. A voltage adjustment to the maximum charging voltage of 14.2 V for the battery is required. This voltage control is performed by the voltage controller or regulator, which periodically disconnects the exciter current in the rotor.

The usual vehicle supply system voltage of 12 V is inadequate for some specific electrical loads, e.g. for thin-film window heating glazing or window defogging strips. These require a voltage of 50 V or more to achieve the required effect. Since the other loads require a vehicle supply system voltage of 12 V, it is necessary to have two different voltage systems.

One possible method of creating two different voltages is to separate the generator from the vehicle supply system and adjust it to the higher voltage required for the window heating glazing with the vehicle supply system being supplied by the battery during this period. With this circuit, however, the battery must fully takeover the vehicle system supply while the window heating glazing is switched on, so that it could be quickly discharged. Since the vehicle will not operate if the vehicle voltage is lost, an elaborate monitoring circuit must be installed to monitor the condition of the battery. Consequently, the circuit is relatively expensive. In addition, the life of the battery is shortened as a result of its rapid discharge.

Another possible method of producing the two different voltages is to generate the higher voltage required for operation of the window heating glazing from the vehicle supply system voltage. For this purpose, a dc voltage converter is required, with the vehicle supply system dc voltage first being converted into an ac voltage, the latter transformed to the higher voltage level and then rectified again.

However, step-up converters of this type have poor efficiency, particularly because of the high voltage drop at the semiconductor switch on the primary side. Because of the higher power to be transmitted in the case of window heating glazing, converters of this type are also large and expensive.

SUMMARY OF THE INVENTION

According to the invention these problems are solved by designing the generator for a voltage higher than the vehicle supply system voltage, which at least corresponds to the voltage required for operation of the window heating glazing, adjusting the voltage supplied by the generator to the vehicle supply system voltage by the controller when the window heating glazing is switched off and deriving the vehicle supply system voltage from the higher voltage, when the window heating glazing is switched on.

Accordingly, the first object of this invention is to provide a vehicle power supply system having more than one voltage.

Another object of this invention is to provide a vehicle power supply system with a first normal voltage and a second voltage which is high enough to drive a window heating glazing.

Another object of this invention is to provide an inexpensive vehicle power supply system having two voltages.

A further object of this invention is to provide a power supply system for a motor vehicle having two different load voltages where the window heating glazing is directly connected to the generator.

A still further object of this invention to provide a power supply circuit for a motor vehicle which has good efficiency, is not large and is inexpensive.

The circuit according to the invention can basically be realized in two different ways.

A first form of the invention is characterized by the fact that with the window heating glazing switched on, the voltage supplied by the generator is adjusted to the required higher voltage by a switchable controller and that the vehicle supply system voltage is derived from the higher voltage with the aid of a dc voltage converter.

With this form of construction, the operation of the window heating glazing does not discharge the battery. Since the converter operates as a step-down converter, the requirements on the switching elements on the one hand and the electrical losses in the semiconductor switch on the other are not as high as for the above-mentioned step-up converter and the costs are correspondingly lower.

A second form of construction of the invention is characterized by the fact that when the window heating glazing is switched on, it is connected in series with the other loads of the vehicle supply system, with both being fed from the higher voltage supplied by the generator.

This form of construction is also a very economical method of construction of two different voltage systems with a single generator. Whereas the generator is connected directly to the vehicle loads and adjusted to the usual vehicle supply system voltage when the window heating glazing is switched off, it is disconnected from the vehicle supply system, connected to the window heating glazing and stepped up during the heating time. The window heating glazing is used as a series resistor for the vehicle supply system. The controller does not limit the generator voltage directly in this case, but the vehicle supply system voltage is in the normal operating condition. In the normal operating condition, i.e. with the heating glazing switched off, the latter is shunted by a switch.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
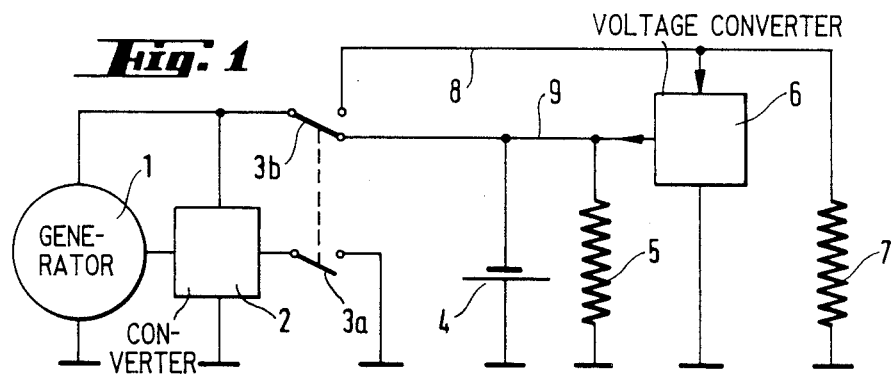
FIG. 1 shows the block diagram for a power supply circuit according to the first embodiment.

Various other objects, features and attendant advantages of the present invention will be more fully appreciated as the same becomes better understood from the following detailed description when considered in connection with the accompanying drawings in which like reference characters designate like or corresponding parts throughout the several views and wherein the power supply circuit is shown in FIG. 1 as comprising the three-phase ac generator 1 provided with a rectifier bridge, a controller 2, a change-over switch 3a, 3b, a battery 4, load 5 of the vehicle supply system shown schematically as a resistor, a voltage converter 6 and a window heating glazing 7 shown schematically as a resistor.

In the condition shown the window heating glazing 7 is not switched on. The dc voltage supplied by the generator 1 and limited to the vehicle supply system voltage by the controller 2 supplies the loads 5 of the vehicle and the battery 4 directly via the contact of the change-over switch 3b. To switch on the heating plate 7 the change-over switches 3a and 3b are each brought into their position, so that the connection to the loads 5 of the vehicle supply system and the battery 4 are interrupted by the change-over switch 3b and the output voltage of the generator 1 is applied directly to the window heating glazing 7 via the line 8. At the same time, the controller 2 is adjusted to a higher voltage level of 50 V, for example, via the switch 3a, so that the required power is available at the window heating glazing 7. To supply the vehicle system the voltage converter 6 is activated at the same time and produces from the generator a dc voltage of 12 to 14 V fed via the line 8, which is applied to loads 5 and to the battery 4 via the line 9.

Figure 2:
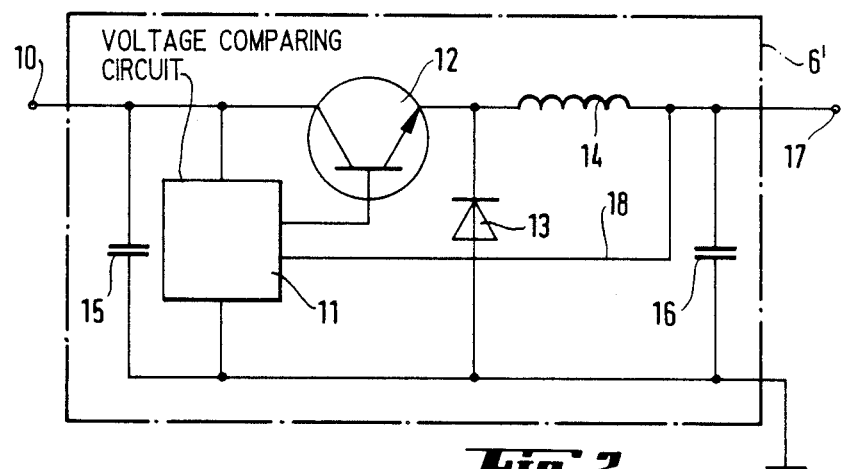
FIG. 2 a first form of construction of a voltage converter used in circuit according to FIG. 1.

FIG. 2 shows the converter drawn as block 6 in FIG. 1 in the form of a pulsed voltage converter 6'. The generator voltage of about 50 V is applied at the input 10. The transistor 12 is switched through to the coil 14 of the switch mode controller 11 until a voltage of 14 V appears at the output 17. This value is fed back via the line 18 to the switch mode controller 11, which, in turn, switches off the transistor 12. The magnetic field produced by the current flow in the coil 14 now collapses and generates a current to output 17 via diode 13. The output voltage becomes smaller as the magnetic field decays. This causes the switch mode controller 11 to switch on the transistor 12 again. Energy-storing capacitors 15 and 16 are provided to keep the current surges of the switch away from the input and output. The switching frequency of the switch determines the dimensioning of the components 14, 15 and 16. To keep the components as small as possible, the switching frequency should exceed 10 kHz. The timed power is taken from a three-phase ac winding, which requires a symmetrical load. The switching frequency should be as high as possible also for this reason. It should be higher than the commutator ripple frequency by at least a factor of 5.

Figure 3:
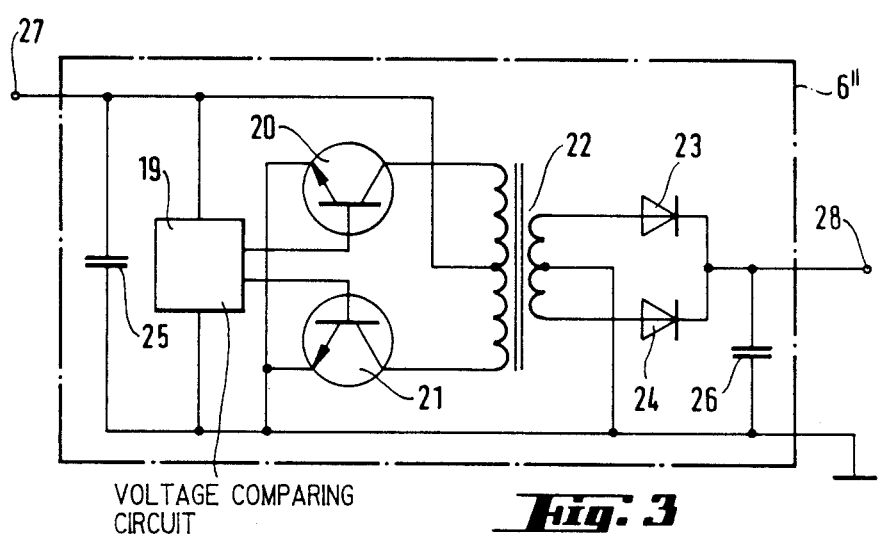
FIG. 3 another form of construction of a voltage converter used in the circuit according to FIG. 1.

FIG. 3 shows a push-pull converter 6", which can be used as an alternative to the pulsed voltage converter 6' in FIG. 2. It consists of a switch mode controller 19 and two switching transistors 20 and 21, which are switched on and off alternately. The transistors are connected to a transformer 22, which has on its primary side a center tap connected to the input 27 of the converter. As the current flows alternately through the upper and lower halves of the coil, an alternating field which is disconnected via the secondary winding is formed in the transformer. The two diodes 23 and 24 rectify the ac voltage. In conformity with the transformation ratio of the transfer 22, a voltage ratio is established between the input 27 and output 28. The storage capacitors 25 and 26 prevent current surges from penetrating outwards from the converter. The switching frequency is the same as for the single-ended converter described with reference to FIG. 2.

Figure 4:
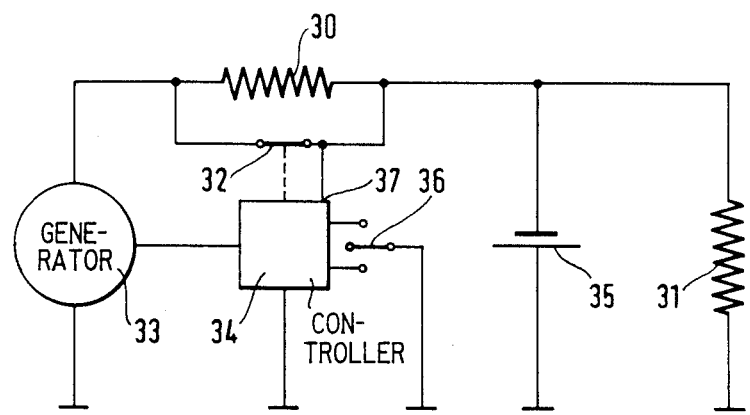
FIG. 4 the block diagram for a power supply circuit according to the second embodiment of the invention, and FIG. 5 an example of construction of an additional safety circuit.

In the circuit according to FIG. 4, the window heating glazing 30, which is shown as a resistor, is connected in series when switched on with the vehicle supply system, the loads 31 of which are jointly represented as a resistor. The circuit diagram shows the switching condition, in which the window heating glazing is shunted off. In this condition the window heating glazing is bridged by the closed switch 32, so that the generator 33, which is adjusted by the controller 34 to the vehicle supply system voltage, is connected directly to the vehicle system, i.e. to the loads 31 and battery 35. The change-over to heating operation is carried out by the inching switch 36. This ensures that the switch 32 is opened, so that the window heating plate 30 now serves directly as a series resistor for the loads 31 dependent upon the vehicle supply system and the controller 34 is subsequently changed over, so that the generator voltage is now stepped up to the required higher voltage.

It is advisable to complete the power supply circuit by additional monitoring elements to ensure a safe operating condition for the system under all circumstances. These additional monitoring elements can basically be used both in the embodiment described in FIG. 1 and also in the embodiment shown in FIG. 4.

For example, it is advisable to limit the heating time, because of the high heating power of the window heating glazing, to prevent over-heating of the latter. Experience has shown that the heating time required to remove the moisture deposit is a maximum of 5 minutes. At temperatures above the freezing point this time may be too longer however, so that the window heating glazing becomes too hot. Hence, as the temperature rises the on-time of the heating plate is continuously reduced from about 5 minutes at 0° C. or lower temperatures, viz. to 1 minute at a temperature of about 25° C. and to zero at a temperature of about 30° C. Hence, the heating operation of the window heating glazing should no longer be possible above a temperature of about 30° C. A representative temperature inside the vehicle is advisably selected as a reference input for this control.

It may also be advisable to provide over-voltage limitation, because dangerous over-voltages may occur upon the fracture of the window heating glazing or a cable. To limit the voltage the generator output voltage is advisably fed back to the controller. If a voltage higher than the preselected one of 80 V, for example, occurs, the controller system interrupts the heating operation and changes over to normal operation.

Furthermore, it is advisable to provide a current limitation during the change-over process. High-power dynamos can supply over 100 A to the vehicle supply system. This current must be transmitted by the switch. To ensure that the switch is not too large and too expensive, the generator voltage is transiently reduced while the window heating glazing is switched on and off.

Figure 5:
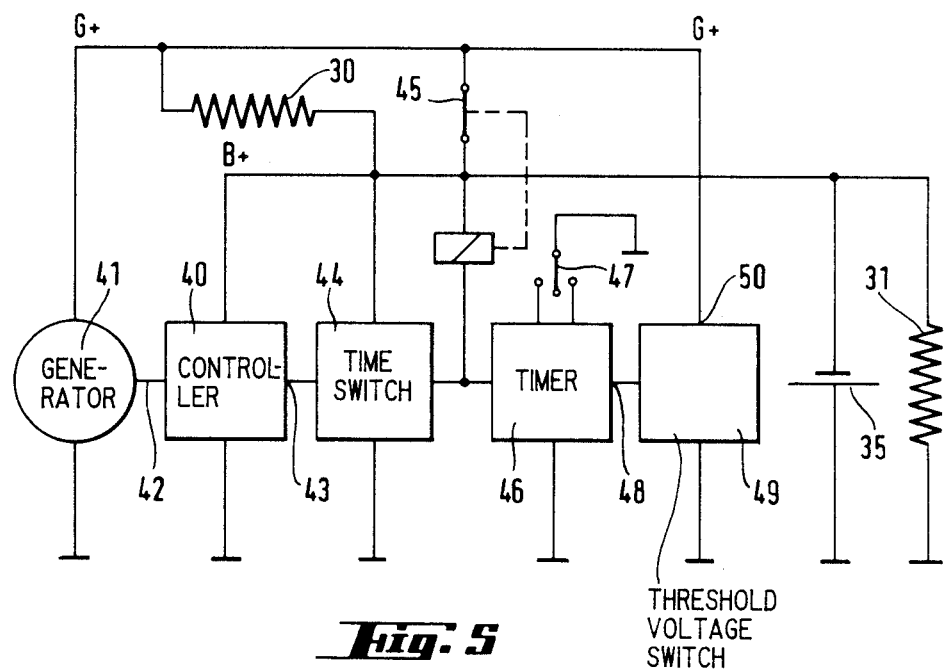

An example of a solution for a power supply circuit with a safety circuit, which meets these specified requirements, is shown in FIG. 5. The controller 40 adjusts the generator 41 via line 42 to constant vehicle supply system voltage B+, with which the battery 35 and loads 31 are supplied. It has an additional input 43, by way of which the field excitation of the generator 41 can be disconnected. The input 43 is controlled by a time switch 44, which transiently forces the controller 40 to adjust to a lower voltage during change-over of the load switch 45. The time switch 44 is controlled by the main timer 46. The main timer 46 is switched on or off manually by the inching switch 47. A temperature sensor integrated in the main timer 46 predetermines the on-time, which is between 0 and 5 minutes. The main timer 46 opens the load switches 45 and thus allows the generator current to flow through the window heating glazing 30. The main timer 46 has a priority input 48 for disconnection. This input 48 is connected to a threshold voltage switch 49. The generator voltage G+ is fed to the input 50 of the threshold voltage switch 49. If the generator voltage G+ exceeds a safety threshold of about 80 V, the threshold value switch 49 transmits a control pulse to the input 48 of the main timer 46, which leads to immediate interruption of the heating operation of the window heating glazing 30.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A power supply circuit for a motor vehicle providing a first standard load voltage and a second load voltage greater than said first load voltage for a window heating unit, comprising:
   a direct current generator which generates at least said second load voltage;
   a voltage controller connected to said generator for producing said first load voltage when said window heating unit is switched off, said first load voltage being derived from said second load voltage when said window heating unit is switched on; and
   a voltage converter for deriving said first load voltage from said second load voltage when said window heating unit is switched on.

2. A power supply circuit according to claim 1, wherein said window heating unit includes a thin film heating resistor.

3. A power supply circuit according to claim 1, wherein said voltage converter is a timed through-flow converter.

4. A power supply circuit according to claim 3, wherein the pulse frequency of the voltage converter is at least 5 times higher than the highest commutator ripple frequency of the generator.

5. A power supply circuit according to claim 1, wherein said voltage converter is a transforming push-pull converter.

6. A power supply circuit according to claim 5, wherein the pulse frequency of the voltage converter is at least 5 times higher than the highest commutator ripple frequency of the generator.

7. A power supply circuit for a motor vehicle providing a first standard load voltage and a second load voltage greater than said first load voltage for a window heating unit, comprising:
   a direct current generator which generates at least said second load voltage;
   a voltage controller connected to said generator for producing said first load voltage when said window heating unit is switched off, said first load voltage being derived from said second load voltage when said window heating unit is switched on; and
   an auxiliary safety circuit to prevent defective operation including a limiting circuit which limits the voltage and includes a timer which transiently reduces the generator voltage when the window heating unit is switched on and off.

8. A power supply circuit according to claim 7, said safety circuit including a time limiting circuit so that the on time of the window heating unit is limited by the time limiting circuit in order to prevent overheating.

9. A power supply circuit according to claim 8, wherein the time limiting circuit is controlled by a temperature sensor which measures the temperature of the vehicle near the wind screen.

10. A power supply circuit according to claim 9, wherein the on time of the window heating unit is limited to 5 minutes at 0° C. and limited to about 1 minute at about 25° C.

11. A power supply circuit according to claim 7, wherein said limiting circuit prevents excessively high voltages in the case of a fault.

12. A power supply circuit according to claim 11, wherein an output voltage from the generator is fed back to the voltage controller to limit the voltage and to interrupt said special load due to an occurrence of an excessively high voltage.

* * * * *